United States Patent [19]

Onishi et al.

[11] Patent Number: 5,380,798
[45] Date of Patent: Jan. 10, 1995

[54] IMPACT-RESISTANT STYRENIC POLYMER RESIN COMPOSITION AND PROCESS FOR MAKING SAME

[75] Inventors: Hidenori Onishi; Hiroaki Matuda, both of Yokohama, Japan

[73] Assignee: Nippon Zeon Co., Ltd., Tokyo, Japan

[21] Appl. No.: 127,735

[22] Filed: Sep. 28, 1993

[30] Foreign Application Priority Data

Sep. 30, 1992 [JP] Japan ................... 4-285021

[51] Int. Cl.⁶ ............... C08L 25/04; C08L 51/04; C08F 279/02
[52] U.S. Cl. ........................ 525/89; 525/98; 525/99
[58] Field of Search ............. 525/99, 98, 89

[56] References Cited

U.S. PATENT DOCUMENTS

| | | | |
|---|---|---|---|
| 4,183,877 | 1/1980 | Ibaragi et al. | 525/70 |
| 4,282,334 | 8/1981 | Walter et al. | 525/53 |
| 4,294,937 | 10/1981 | Whitehead | 525/99 |

FOREIGN PATENT DOCUMENTS

| | | |
|---|---|---|
| 0196013 | 10/1986 | European Pat. Off. . |
| 0429986 | 6/1991 | European Pat. Off. . |
| 3409656 | 9/1986 | Germany . |
| 42-17492 | 9/1967 | Japan . |
| 48-18594 | 6/1973 | Japan . |
| 51-131590 | 11/1976 | Japan . |
| 6057443 | 9/1977 | Japan . |
| 56-2310 | 1/1981 | Japan . |
| 64-74208 | 3/1989 | Japan . |
| 64-74209 | 3/1989 | Japan . |
| 1230507 | 5/1971 | United Kingdom . |

OTHER PUBLICATIONS

Database WPI, Week 9328, Derwent Publications Ltd., London, GB; AN 93-224341 & JP-A-5 148 331 (Nippon Zeon K.K.) 15 Jun. 1993 (Abstract).

Database WPI, Week 9011, Derwent Publications Ltd., London, GB; AN 90-080338 & JP-A-2 034 614 (Nippon Polystyrene) 5 Feb. 1990 (Abstract).

*Primary Examiner*—James J. Seidleck
*Assistant Examiner*—I. Zemel
*Attorney, Agent, or Firm*—Birch, Stewart, Kolasch & Birch

[57] ABSTRACT

An impact-resistant styrenic polymer resin composition comprising 70-97 wt. % of a styrenic polymer resin and 3-30 wt. % of a toughening agent of a fine particle form having an average particle diameter of 0.3-0.7 μm and dispersed in the styrenic polymer resin. The toughening agent comprises (I) 10-98 wt. % of a styrene/butadiene di-block copolymer having (i) a weight average molecular weight (MW) of 30,000-1,000,000, (ii) a MW distribution of 1.00-1.20 as defined by the weight average MW/number average MW ratio, (iii) a total bound styrene content of 30-70 wt. %, and (iv) a block styrene content of at least 60% based on the total bound styrene content; and (II) 2-90 wt. % of a styrene/butadiene copolymer rubber, polybutadiene or a mixture thereof, which has (i) a weight average MW of 1,000-1,000,000, (ii) a MW distribution of 1.00-1.60 as defined by the weight average MW/number average MW ratio, (iii) a total bound styrene content of 0-15 wt. %, and (iv) a cis-1,4 bond content of 10-80 wt. %; and the toughening agent has a JIS A hardness not larger than 75.

The impact-resistant styrene polymer resin composition is prepared by subjecting a mixture of 3-30 wt. % of the toughening agent and 70-97 wt. % of the styrenic monomer or its mixture, to bulk polymerization or bulk-suspension polymerization.

10 Claims, No Drawings

IMPACT-RESISTANT STYRENIC POLYMER RESIN COMPOSITION AND PROCESS FOR MAKING SAME

BACKGROUND OF THE INVENTION (1) Field of the Invention

This invention relates to an impact-resistant styrenic polymer resin composition having well-balanced impact resistance and gloss, and a process for making the impact-resistant styrenic polymer resin composition.

(2) Description of the Related Art

Impact-resistant styrenic polymer resin compositions are made by a process wherein a solution of a toughening agent such as polybutadiene in a styrenic monomer is subjected to a bulk polymerization or a bulk-suspension polymerization. The resulting impact-resistant styrenic polymer resin compositions have an improved impact resistance but a poor surface gloss, as compared with polystyrene. To enhance the surface gloss of the impact-resistant styrenic polymer resin compositions, a process was proposed wherein polybutadiene having a relatively low viscosity is used (JP-A-51-131590). The surface gloss obtained by this process is still not satisfactory. Another process was proposed wherein a styrene/butadiene block copolymer is used (JP-B-42-17492, JP-B-48-18594 and JP-B-60-57443). Impact-resistant styrenic polymer resin compositions made by this process are characterized in that rubber particles dispersed in the resin compositions have a very small particle diameter, and thus, the surface gloss is improved, but the impact resistance is reduced. Further, the styrene/butadiene block copolymer is easily reduced to powder and generally has poor handling properties, as compared with conventional rubbery polymers, such as polybutadiene.

A further process was proposed wherein a styrene/butadiene block copolymer having specific styrene blocks is used (JP-A-64-74208 and JP-A-64-74209). The use of such block copolymer results in somewhat improved handling properties, but the impact resistance of the resulting resin composition is still not satisfactory. Still another process was proposed wherein polybutadiene is used in combination with a minor amount of a styrene/butadiene block copolymer (JP-A-56-2310). The impact resistance is improved by this process, but the surface gloss is approximately similar to those of the conventional impact-resistant styrenic polymer resin compositions.

SUMMARY OF THE INVENTION

In view of the foregoing, a primary object of the invention is to provide an impact-resistant styrenic polymer resin composition having well-balanced surface gloss and impact resistance.

Another object of the invention is to provide a process for making an impact-resistant styrenic polymer resin composition having well balanced surface gloss and impact resistance.

In one aspect of the invention, there is provided an impact-resistant styrenic polymer resin composition comprising, based on the weight of the impact-resistant styrenic polymer composition, 70 to 97% by weight of a styrenic polymer resin and 3 to 30% by weight of a toughening agent which is in the form of fine particles having an average particle diameter of 0.3 to 0.7 μm and dispersed in the styrenic polymer resin;

said toughening agent comprising:

(I) 10 to 98 parts by weight of a styrene/butadiene di-block copolymer having (i) a weight average molecular weight of 30,000 to 1,000,000, (ii) a molecular weight distribution of 1.00 to 1.20 as defined by the ratio of weight average molecular weight to number average molecular weight, (iii) a total bound styrene content of 30 to 70% by weight, and (iv) a block styrene content of at least 60% based on the total bound styrene content; and (II) 2 to 90 parts by weight of a styrene/butadiene copolymer rubber, polybutadiene or a mixture of a styrene/butadiene copolymer rubber and polybutadiene, which has (i) a weight average molecular weight of 1,000 to 1,000,000, (ii) a molecular weight distribution of 1.00 to 1.60 as defined by the ratio of weight average molecular weight to number average molecular weight, (iii) a total bound styrene content of 0 to 15% by weight, and (iv) a cis-1,4 bond content of 10 to 80%;

wherein the total amount of (I) and (II) is 100 parts by weight, and the toughening agent has a JIS A hardness not larger than 75.

In another aspect of the invention, there is provided a process for making an impact-resistant styrenic polymer resin composition comprising a styrenic polymer resin and a toughening agent which is in the form of fine particles having an average particle diameter of 0.3 to 0.7 μm and dispersed in the styrenic polymer resin;

which process comprises subjecting a mixture comprising, based on the weight of the mixture, 3 to 30% by weight of a toughening agent and 70 to 97% by weight of a styrenic monomer or a monomeric mixture comprising a styrenic monomer and other copolymerizable monomer, to a bulk polymerization or a bulk-suspension polymerization;

said toughening agent comprising:

(I) 10 to 98 parts by weight of a styrene/butadiene di-block copolymer having (i) a weight average molecular weight of 30,000 to 1,000,000, (ii) a molecular weight distribution of 1.00 to 1.20 as defined by the ratio of weight average molecular weight to number average molecular weight, (iii) a total bound styrene content of 30 to 70% by weight, and (iv) a block styrene content of at least 60% based on the total bound styrene content; and (II) 2 to 90 parts by weight of a styrene/butadiene copolymer rubber, polybutadiene or a mixture of a styrene/butadiene copolymer rubber and polybutadiene, which has (i) a weight average molecular weight of 1,000 to 1,000,000, (ii) a molecular weight distribution of 1.00 to 1.60 as defined by the ratio of weight average molecular weight to number average molecular weight, (iii) a total bound styrene content of 0 to 15% by weight, and (iv) a cis-1,4 bond content of 10 to 80%;

wherein the total amount of (I) plus (II) is 100 parts by weight, and the toughening agent has a JIS A hardness not larger than 75.

DESCRIPTION OF THE PREFERRED EMBODIMENTS

The toughening agent used in the invention comprises (I) a styrene/butadiene di-block copolymer and (II) a styrene/butadiene copolymer rubber or polybutadiene or a mixture thereof. The styrene/butadiene di-block copolymer (I) has a weight average molecular weight of 30,000 to 1,000,000. The term "weight average molecular weight" used herein and hereinafter in this specification means molecular weight as expressed in terms of that of standard polystyrene as measured by gel permeation chromatography. If the molecular weight is smaller than 30,000, the impact-resistance of the impact-resistant styrenic polymer resin composition is still not satisfactory. If the molecular weight is larger than 1,000,000, the di-block copolymer is easily decreased to powder and the handling properties are not satisfactory. A preferable weight average molecular weight is in the range of 100,000 to 800,000. Further, the styrene/butadiene di-block copolymer has a molecular weight distribution of 1.00 to 1.20 as defined by the ratio of weight average molecular weight to number average molecular weight. If the molecular weight distribution exceeds 1.20, the gloss of the impact-resistant styrenic polymer resin composition becomes poor.

The total bound styrene content in the styrene/butadiene di-block copolymer (I) is 30 to 70% by weight. If the total bound styrene content is smaller than 30% by weight, the gloss is not improved to the desired extent. When the total bound styrene content is high, the acceptable variation in the amount of the styrene/butadiene copolymer rubber, polybutadiene or a mixture thereof (II) is increased and an impact-resistant styrene polymer resin composition having highly balanced impact resistance and surface gloss can be obtained, but when the total bound styrene content exceeds 70% by weight, the impact resistance is reduced. The total bound styrene content is preferably in the range of exceeding 45% by weight but not larger than 70% by weight. The block styrene content in the styrene/butadiene di-block copolymer (I) is at least 60% of the total bound styrene content. If the block styrene content is 60% or smaller, the gloss is reduced. The block styrene content is preferably at least 70% of the total bound styrene content.

The styrene/butadiene di-block copolymer may have either a complete SB block copolymer having a polystyrene block (S)-polybutadiene block (B) structure, or a tapered SB block copolymer wherein the boundary between a polystyrene block (S) and a polybutadiene block (B) is obscure and styrene is tapered off from S to B in the boundary region. These styrene/butadiene di-block copolymers can be made by conventional procedures and the making procedures are not particularly limited.

The other component (II) in the toughening agent used in the invention is a styrene/butadiene copolymer rubber having a bound styrene content of 0 to 15% by weight, polybutadiene or a mixture thereof. If the bound styrene content in the styrene/butadiene copolymer rubber exceeds 15% by weight, luster is decreased. The bound styrene content is preferably not larger than 10% by weight. The component (II) has a weight average molecular weight of 1,000 to 1,000,000. If the molecular weight is smaller than 1,000, the impact resistance is not improved. If the molecular weight exceeds 1,000,000, the viscosity of the polymerization mixture becomes too high to control the diameter of particles of the toughening agent. The weight average molecular weight of the component (II) is preferably in the range of 3,000 to 800,000. The component (II) has a molecular weight distribution, as defined by the ratio of weight average molecular weight to number average molecular weight, of 1.00 to 1.60, preferably 1.00 to 1.50. Both polybutadiene and the butadiene portion of the styrene/butadiene copolymer rubber in the component (II) should have a cis-1,4 bond content of 10 to 80%, preferably 10 to 50% by weight, in view of compatibility of the component (II) with the component (I).

As the styrene/butadiene copolymer rubber (SBR), there can be mentioned a low cis-SBR which is prepared by an emulsion polymerization or a solution polymerization. The distribution of styrene chain in SBR is not particularly limited, but a random distribution is preferable.

The amounts of the components (I) and (II) are 10 to 98 parts by weight and 2 to 90 parts by weight, respectively, based on 100 parts by weight of the sum of (I) and (II). If the amount of (I) is smaller than 10 parts by weight, the gloss is not improved. If the amount of (II) is larger than 98 parts by weight, the impact resistance is reduced. Preferably the amount of (I) is 20 to 80 parts by weight.

The toughening agent, i.e., a mixture of the above-specified amounts of the components (I) and (II), used in the invention has a JIS A hardness not larger than 75, preferably in the range of 20 to 70. If the JIS A hardness of the mixture of (I) and (II) exceeds 75, problems occur in making the mixture and the resulting impact-resistant styrenic polymer resin composition has a poor impact resistance.

The impact-resistant styrenic polymer resin composition of the invention is made by a process wherein 3 to 30% by weight of the toughening agent, i.e., the sum of the components (I) and (II), is dissolved in 70 to 97% by weight of a styrenic monomer or a monomeric mixture of a styrenic monomer and a copolymerizable monomer, and the thus-prepared solution is subjected to radical polymerization by a bulk polymerization procedure or a bulk-suspension polymerization procedure.

The components (I) and (II) may be added either simultaneously or successively into the styrenic monomer or its mixture. Alternatively, the components (I) and (II) are mixed together and the mixture is then added into the styrenic monomer or its mixture. The mixture of the components (I) and (II) can be prepared, for example, by the following methods: (i) a method wherein (I) and (II) both in a solid state are mixed by a mixer such as a Banbury mixer or a roll mixer; (ii) a method wherein a solution (usually called as "cement") of (I) and a cement of (II) both as obtained separately by polymerization are mixed together, and a mixture of (I) and (II) is separated from the mixed solution and then dried by a conventional procedure; (iii) a method wherein a part of an active polymer produced is deactivated midway in the course of polymerization for (I) or (II), and another monomer for (II) or (I) is added to the deactivated polymer, followed by completion of polymerization; and (iv) a method wherein a polymerization catalyst and a monomer for (I) or (II) are added to a polymerization mixture midway in the course of polymerization for (II) or (I), followed by completion of polymerization.

By the term "styrenic monomer" we mean styrene or styrene derivatives such as, for example, α-methylstyrene, vinyltoluene and chlorostyrene. As the monomer copolymerizable with the styrenic monomer, there can be mentioned unsaturated nitrile monomers such as acrylonitrile and methacrylonitrile, acrylic acid esters such as methyl acrylate, and methacrylic acid esters such as methyl methacrylate. The amount of the copolymerizable monomer is not larger than 50% based on the monomeric mixture.

When a solution of the toughening agent in a styrenic monomer or a monomeric mixture comprising a styrenic monomer and a copolymerizable monomer is subjected to a bulk polymerization or a bulk-suspension polymerization, additional ingredients such as a diluent, e.g., toluene or ethylbenzene, an antioxidant, and a chain transfer agent, e.g., a mercaptan or a dimer of α-methylstyrene, are optionally added to the solution. A polymerization catalyst may or may not be used. When the catalyst is used, polymerization is carried out usually at a temperature of 20° to 180° C. When not used, polymerization is carried out under heating usually at a temperature of 80° to 200° C. As examples of the catalyst, there can be mentioned peroxides such as acetyl peroxide, benzoyl peroxide, isobutyryl peroxide and bis-3,5,5-trimethylhexanoyl peroxide, and azo compounds such as azobisisobutyronitrile.

The procedure for a bulk polymerization or a bulk-suspension polymerization is not particularly limited, and procedures known and conventionally employed for making impact-resistant polystyrene resin compositions.

In the thus-made impact-resistant styrene polymer resin composition, the toughening agent is in the form of fine particles having an average particle diameter of 0.3 to 0.7 μm and dispersed in a matrix. 50 to 70% of the total dispersed particles have a core/shell structure, and the remainder have a spherical structure, a cell structure and/or a coalescent particle structure composed of core/shell structures. Thus, the dispersed particles of the toughening agent in the impact-resistant styrene polymer resin composition of the invention predominantly have a core/shell structure, and therefore, the resin composition exhibits balanced gloss and impact-resistance and enhanced transparency.

The invention will be specifically described by the following examples. In the examples and comparative examples, parts and % are by weight unless otherwise specified.

EXAMPLE 1 to 11 AND COMPARATIVE EXAMPLES 1 to 5

The styrene/butadiene (SB) block copolymers (I) used are shown in Table 1 wherein SB block copolymers I-4 and I-8 are tapered SB block copolymers and the remainder are complete SB block copolymers. The weight average molecular weight was expressed in terms of that of standard polystyrene as measured by gel permeation chromatography (HLC8020 supplied by Tosoh Corporation; columns: G4000XL and G5000XL). The total bound styrene content was measured by 500 MHz-NMR. The block styrene content was measured by the method of Tanaka (Polymer Preprints, Japan, vol. 29, No. 9, p 2055-2058, published by the Soc. of Polymer Sci., Japan (1980), and expressed as the ratio of block styrene content/total bound styrene content. The above-mentioned properties and the molecular weight distribution are shown in Table 1.

TABLE 1

| Block copoly-mers | Total bound styrene content (%) | Block styrene content (%) | Weight average molecular weight × $10^{-4}$ | Molecular weight distribution |
|---|---|---|---|---|
| I-1 | 63.2 | 98.9 | 20.9 | 1.07 |
| I-2 | 50.1 | 95.8 | 48.0 | 1.09 |
| I-3 | 50.2 | 97.8 | 16.0 | 1.04 |
| I-4 | 40.0 | 75.3 | 49.0 | 1.08 |
| I-5 | 40.2 | 98.1 | 30.2 | 1.07 |
| I-6 | 30.4 | 95.7 | 41.5 | 1.07 |
| I-7 | 23.3 | 97.6 | 25.0 | 1.06 |

TABLE 1-continued

| Block copoly-mers | Total bound styrene content (%) | Block styrene content (%) | Weight average molecular weight × $10^{-4}$ | Molecular weight distribution |
|---|---|---|---|---|
| I-8 | 41.3 | 87.5 | 30.5 | 1.65 |

Polybutadiene II-1, II-3, II-4, II-5 and II-6 and styrene/butadiene copolymers II-2 and II-7 were prepared by using a n-butyllithium catalyst. Polybutadiene II-4 was prepared by using a Co catalyst. The total bound styrene content as measured by 500 MHz-NMR, the micro-structure as measured by infrared spectrophotometry wherein polybutadiene and SBR were analyzed by Morrero method and Hampton method, respectively, the weight average molecular weight and the molecular weight distribution are shown in Table 2. Polybutadiene II-5 is commercially available ("Diene 35" supplied by Asahi Kasei Kogyo K. K.).

TABLE 2

| Poly-mers | Bound styrene content (%) | Micro-structure in butadiene portion | | | Weight average molecular weight × $10^{-4}$ | Molecular weight distribution |
|---|---|---|---|---|---|---|
| | | Cis | Trans (%) | Vinyl | | |
| II-1 | 0 | 15.2 | 32.3 | 32.5 | 0.77 | 1.07 |
| II-2 | 5.2 | 31.4 | 49.2 | 19.4 | 25.2 | 1.21 |
| II-3 | 0 | 35.9 | 54.0 | 10.1 | 26.3 | 1.20 |
| II-4 | 0 | 97.2 | 1.5 | 1.3 | 45.0 | 2.51 |
| II-5 | 0 | 35.2 | 52.5 | 12.3 | 42.5 | 2.26 |
| II-6 | 0 | 35.5 | 54.2 | 10.3 | 89.0 | 1.30 |
| II-7 | 45.1 | 26.9 | 42.9 | 30.2 | 15.0 | 1.08 |

Impact-resistant polystyrene resin compositions were prepared from the above-mentioned block copolymers I-1 to I-8 and II-1 to II-7. A polyethylene vessel having a volume of 10 liters was charged with 276 g of a mixture of block copolymer I and polymer II (the proportion of I and II is shown in Tables 3, 4 and 5), and 2,024 g of styrene, and the contents were shaken at room temperature for 16 hours whereby a solution of a toughening agent in styrene was prepared.

The entire amount of the styrene solution was transferred into a stainless steel reactor having an inner volume of 4 liters and the solution was subjected to polymerization at 130° C. for 2.5 hours while shearing action was given with stirring. Then the content was cooled and taken out. A stainless steel reactor having a volume of 8 liters was charged with 1,250 g of the content and 3,750 g of an aqueous 2% polyvinyl alcohol solution, and was heated to 70° C. Into the heated reactor, 2.5 g of benzoyl peroxide and 1.26 g of dicumyl peroxide were added, and the content was maintained at 70° C. for 1 hour, 90° C. for 1 hour, 110° C. for 1 hour and 130° C. for 4 hours, whereby suspension polymerization was effected. After completion of polymerization, the content was cooled to room temperature. The resultant impact-polystyrene resin composition was filtered, recovered, washed with water and then dried at 60° C. under a reduced pressure for 6 hours.

The resin composition was pelletized by using an extruder, and the pellets were molded by an injection molding machine into a sample for Izod impact test and a sample for gloss test. Using the samples, Izod impact strength and gloss were determined according to JIS K7110 and tensile properties were determined according to JIS K7113. A part of a sample was made into very thin slices by using an ultramicrotome, and a microphotograph of dispersed particles were taken by using a transmitting electron microscope. Particle diameter of the dispersed particles of the toughening agent was measured on the microphotograph. The average particle diameter was determined as follows. The major diameter and the minor diameter were measured on 1,000 particles. The arithmetic mean value (Di) of the major diameter and the minor diameter of each particle was calculated and the average particle diameter was calculated as a number average particle diameter according to the formula: $\Sigma nDi/\Sigma n$ wherein n is number of particles with a diameter Di. The results are shown in Tables 3 to 5.

JIS A hardness of a mixture of block copolymer I and polymer II was determined as follows. Block copolymer I and polymer II were mixed together at a mixing ratio shown in Tables 3 to 5, and 50 g of the mixture was dissolved in 450 g of toluene. The resulting solution was incorporated in a 1.5% solution of 2,6-di-t-butyl-p-cresol in methanol to coagulate a polymer composition, followed by separation and drying under a reduced pressure. The polymer composition was pressed into a sheet having a thickness of 2 mm at 50° C. under a pressure of 100 kg/cm² for 12 hours. The results are shown in Tables 3 to 5.

TABLE 3

| Polymers | Examples | | | | | | |
|---|---|---|---|---|---|---|---|
|  | 1 | 2 | 3 | 4 | 5 | 6 | 7 |
|  | (%) | | | | | | |
| I-1 | 20 | | | | | | |
| I-2 |  | 40 | 60 | | | | |
| I-3 |  |  |  | 20 | | | |
| I-4 |  |  |  |  | 40 | 60 | |
| I-5 |  |  |  |  |  |  | 80 |
| I-6 | | | | | | | |
| I-7 | | | | | | | |
| I-8 | | | | | | | |
| II-1 |  |  |  |  |  |  | 20 |
| II-2 | | | | | | | |
| II-3 | 80 | 60 | 40 | 80 | 60 | 40 | |
| II-4 | | | | | | | |
| II-5 | | | | | | | |
| II-6 | | | | | | | |
| II-7 | | | | | | | |
| JIS A hardness of polymer mixture | 45 | 47 | 61 | 39 | 35 | 56 | 58 |
| Izod impact strength (kg cm/cm) | 5.5 | 7.0 | 5.6 | 5.0 | 7.5 | 6.7 | 5.0 |
| Gloss (%) | 98 | 96 | 98 | 98 | 95 | 96 | 98 |
| Average particle diameter (μm) | 0.35 | 0.49 | 0.37 | 0.32 | 0.55 | 0.46 | 0.33 |

TABLE 4

| Polymers | Examples | | | | Comp. Examples | | |
|---|---|---|---|---|---|---|---|
|  | 8 | 9 | 10 | 11 | 1 | 2 | 3 |
|  | (%) | | | | | | |
| I-1 | | | | | | | |
| I-2 | | | | | | | |
| I-3 | | | | | | 100 | |
| I-4 | | | | | 100 | | |
| I-5 | 80 | | | 90 | 100 | | |
| I-6 | | 90 | 70 | | | | |
| I-7 | | | | | | | |
| I-8 | | | | | | | |
| II-1 | | | | | | | |
| II-2 | 20 | | | | | | |
| II-3 | | 10 | 30 | | | | |
| II-4 | | | | | | | |
| II-5 | | | | | | | |
| II-6 | | | | 10 | | | |
| II-7 | | | | | | | |
| JIS A hardness of polymer mixture | 67 | 46 | 39 | 73 | 76 | 73 | 98 |
| Izod impact strength (kg cm/cm) | 5.1 | 5.0 | 5.3 | 5.0 | 2.5 | 3.0 | 2.0 |
| Gloss (%) | 98 | 98 | 98 | 99 | 99 | 99 | 99 |
| Average particle diameter (μm) | 0.33 | 0.31 | 0.37 | 0.35 | 0.21 | 0.25 | 0.13 |

TABLE 5

| Polymers | Comparative Examples | |
|---|---|---|
|  | 4 | 5 |
|  | (%) | |
| I-1 | 80 | |
| I-2 | | |
| I-3 | | |
| I-4 | | |
| I-5 | | 80 |
| I-6 | | |
| I-7 | | |
| I-8 | | |
| II-1 | | |
| II-2 | | |
| II-3 | 20 | |
| II-4 | | 20 |
| II-5 | | |
| II-6 | | |
| II-7 | | |
| JIS A hardness of polymer mixture | 95 | 64 | 56 | 87 | 40 | 65 | 59 |
| Izod impact strength (kg cm/cm) | 1.8 | 7.8 | 8.0 | 2.8 | 8.8 | 5.5 | 6.5 |
| Gloss (%) | 99 | 85 | 84 | 99 | 80 | 92 | 85 |
| Average particle diameter (μm) | 0.10 | 0.60 | 0.71 | 0.25 | 0.85 | 0.40 | 0.49 |

What is claimed is:

1. An impact-resistant styrenic polymer resin composition comprising, based on the weight of the impact-resistant styrenic polymer composition, 70 to 97% by weight of a styrenic polymer resin and 3 to 30% by weight of a toughening agent which is in the form of fine particles having an average particle diameter of 0.3 to 0.7 μm and dispersed in the styrenic polymer resin, wherein said styrenic polymer resin is obtained by polymerizing a styrenic monomer or monomer mixture comprising at least 50% by weight of a styrenic monomer selected from the group consisting of styrene, α-methylstyrene, vinyltoluene, and chlorostyrene, and not more than 50% by weight of a copolymerizable monomer selected from the group consisting of unsaturated nitrile monomers, acrylic acid esters, and methacrylic acid esters;

said toughening agent comprising:
(I) 10 to 98 parts by weight of a styrene/butadiene di-block copolymer having (i) a weight average molecular weight of 30,000 to 1,000,000, (ii) a molecular weight distribution of 1.00 to 1.20 as defined by the ratio of weight average molecular weight to number average molecular weight; (iii) a total bound styrene content of 30 to 70% by weight, and (iv) a block styrene content of at least 60% based on the total bound styrene content; and (II) 2 to 90 parts by weight of a styrene/butadiene copolymer rubber, polybutadiene or a mixture of a styrene/butadiene copolymer rubber and polybutadiene, which has (i) a weight average molecular weight of 1,000 to 1,000,000, (ii) a molecular weight distribution of 1.00 to 1.60 as defined by the ratio of weight average molecular weight to number average molecular weight, (iii) a total bound styrene content of 0 to 15% by weight, and (iv) a cis-1,4 bond content of 10 to 80%;

wherein the total amount of (I) and (II) is 100 parts by weight, and the toughening agent has a JIS A hardness not larger than 75.

2. The resin composition according to claim 1 wherein the styrene/butadiene di-block copolymer has a weight average molecular weight of 100,000 to 800,000.

3. The resin composition according to claim 1 wherein the styrene/butadiene di-block copolymer has a total bound styrene content of exceeding 45% by weight but not larger than 70% by weight.

4. The resin composition according to claim 1 wherein the styrene/butadiene copolymer rubber and polybutadiene have a weight average molecular weight of 3,000 to 800,000.

5. A process for making an impact-resistant styrenic polymer resin composition comprising a styrenic polymer resin and a toughening agent which is in the forth of fine particles having an average particle diameter of 0.3 to 0.7 μm and dispersed in the styrenic polymer resin;

which process comprises subjecting a mixture comprising, based on the weight of the mixture, 3 to 30% by weight of a toughening agent and 70 to 97% by weight of a styrenic monomer or a monomeric mixture comprising at least 50% by weight of a styrenic monomer selected from the group consisting of styrene, α-methylstyrene vinyltoluene, and chlorostyrene, and not more than 50% by weight of a copolymerizable monomer selected from the group consisting of acrylonitrile, methacrylonitrile, methyl acrylate, and methyl methacrylate, to a bulk polymerization or a bulk-suspension polymerization;

said toughening agent comprising:

(I) 10 to 98 parts by weight of a styrene/butadiene di-block copolymer having (i) a weight average molecular weight of 30,000 to 1,000,000, (ii) a molecular weight distribution of 1.00 to 1.20 as defined by the ratio of weight average molecular weight to number average molecular weight, (iii) a total bound styrene content of 30 to 70% by weight, and (iv) a block styrene content of at least 60% based on the total bound styrene content; and (II) 2 to 90 parts by weight of a styrene/butadiene copolymer rubber, polybutadiene or a mixture of a styrene/butadiene copolymer rubber and polybutadiene, which has (i) a weight average molecular weight of 1,000 to 1,000,000, (ii) a molecular weight distribution of 1.00 to 1.60 as defined by the ratio of weight average molecular weight to number average molecular weight, (iii) a total bound styrene content of 0 to 15% by weight, and (iv) a cis-1,4 bond content of 10 to 80%;

wherein the total amount of (I) plus (II) is 100 parts by weight, and the toughening agent has a JIS A hardness not larger than 75.

6. The resin composition according to claim 1 wherein said toughening agent is in the form of fine particles dispersed in a matrix of the styrenic polymer resin and predominantly have a core/shell structure.

7. The resin composition according to claim 1, wherein the amount of component (II) is at least 40 parts by weight based on 100 parts by weight of the sum of components (I) and (II).

8. The process according to claim 5 wherein the styrene/butadiene di-block copolymer has a weight average molecular weight of 100,000 to 800,000.

9. The process according to claim 5 wherein the styrene/butadiene di-block copolymer has a total bound styrene content of exceeding 45% by weight but not larger than 70% by weight.

10. The process according to claim 5 wherein the styrene/butadiene copolymer rubber and polybutadiene have a weight average molecular weight of 3,000 to 800,000.

* * * * *